United States Patent [19]
More et al.

[11] Patent Number: 5,035,766
[45] Date of Patent: Jul. 30, 1991

[54] DEFORMABLE DIE FOR USE WITH SEALANT PADS

[75] Inventors: James R. More, Woodbury, Minn.; Arnold T. Olsen; John S. Young, both of Austin, Tex.

[73] Assignee: Minnesota Mining and Manufacturing Company, St. Paul, Minn.

[21] Appl. No.: 410,957

[22] Filed: Sep. 22, 1989

[51] Int. Cl.⁵ .............................................. B30B 1/00
[52] U.S. Cl. ................................. 156/581; 156/580; 156/583.3; 156/49; 100/211; 264/313
[58] Field of Search ............... 156/580, 583.1, 583.3, 156/581, 245, 48, 49; 100/211, 93 P; 264/313; 425/233

[56] References Cited

U.S. PATENT DOCUMENTS

| 2,169,280 | 8/1939 | Pfanstiehl | 269/313 X |
| 2,356,225 | 8/1944 | Cunnington | 156/206 X |
| 4,135,957 | 1/1979 | Voller | 156/581 X |
| 4,863,535 | 9/1989 | More | 156/49 |
| 4,870,251 | 9/1989 | Anemaet | 156/583.3 X |
| 4,878,969 | 11/1989 | Janisch | 156/49 |

FOREIGN PATENT DOCUMENTS

0077756  4/1983  European Pat. Off. .............. 156/87

OTHER PUBLICATIONS

Exhibit A: Electrical Moisture Sealant Pads 09092.

*Primary Examiner*—David A. Simmons
*Assistant Examiner*—J. Sells
*Attorney, Agent, or Firm*—Gary L. Griswold; Walter N. Kirn; John C. Barnes

[57] ABSTRACT

Die plates for forming moisture seals about the junctions of wire harnesses afford improved wire separation and contact between the sealant material in a sealant pad and the wires if the opposed die plates have an elastomeric surface, and the opposed surface of at least one plate is radiused causing the sealant material to separate the wires and flow between and around each wire.

6 Claims, 3 Drawing Sheets

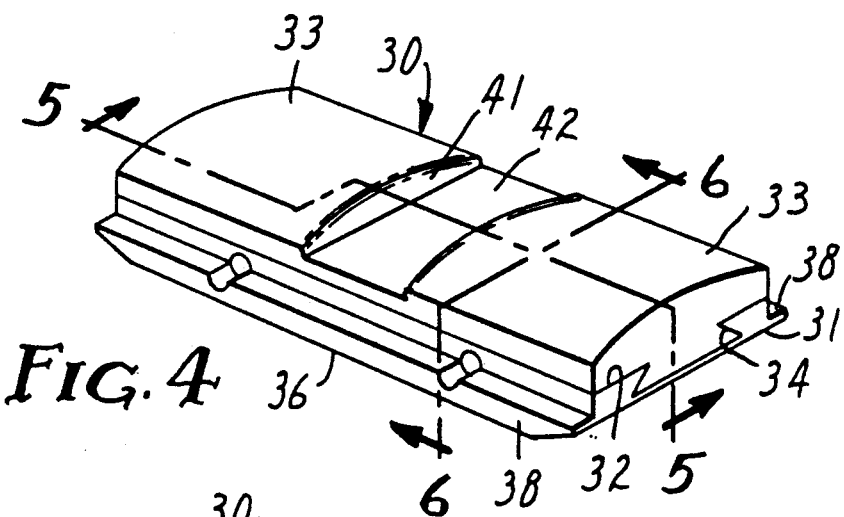
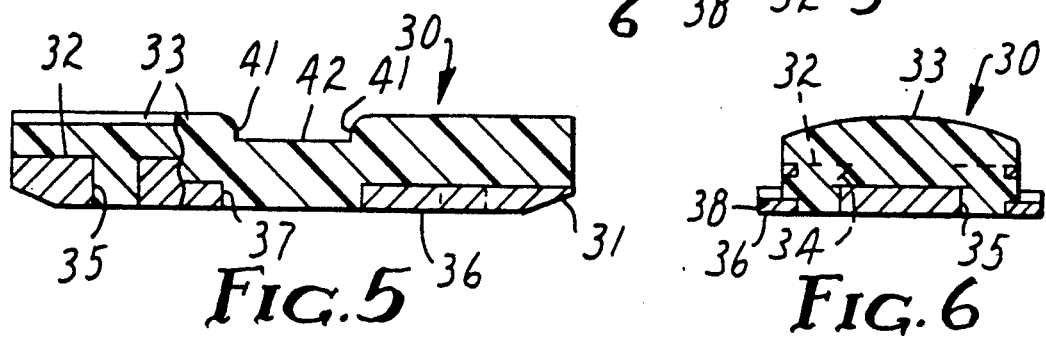
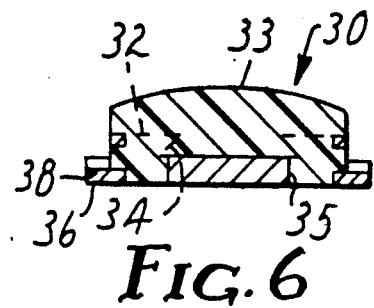
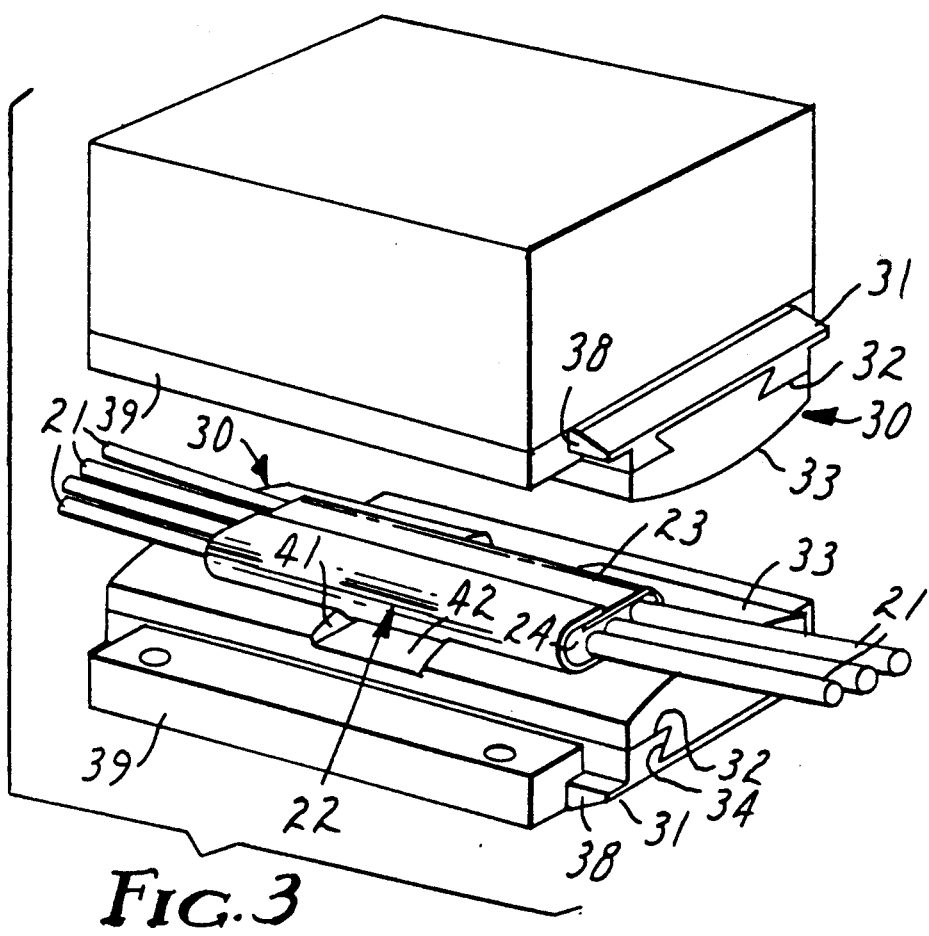

DEFORMABLE DIE FOR USE WITH SEALANT PADS

BACKGROUND OF THE INVENTION

1. Field of the Invention

This invention relates to an improvement in a die structure for use in forming seals about the junctions between electrical wires, and in one aspect to an improved elastomeric generally cylindrical die plate which will afford improvement in placing a sealant around the junction and around each of the wires leading to the junction to make a good moisture seal.

2. Description of the Prior Art

It is known to place a sealant pad about the junction between several wires and then to place the pad and wire junction between metal dies in a press and allow the press to close to force the sealant on the sealant pad into contact and seal water or contaminants from the junction. In known instances however, where there is a plurality of wires, or bundle of wires, coming into one side of the pad the sealant on the sealant pad did not flow firmly about each of the wires and into intimate contact with each of the wires. This allows moisture to migrate along the wire to the junction and cause contamination. The prior die plates comprised identical metal plates mounted as mirror images and the plates included a recess having opposite side walls or ridges. The recess was a generally concave depression having a radius sufficient to receive a particular wire size. The recess and end surfaces generally define flow directing means which directed the sealant flow in a preferred manner. The radiused recess area of the die plates is formed about an axis transverse to the direction the wires were to extend from the die plates and, with flat areas opposite each other at the sides of the sealant pads, the sealant in the pads did not suitably surround and seal the wires in the wire harness or cable. This prior art structure is disclosed in U.S. Pat. No. 4,863,535, issued on application Ser. No. 07/130,541 filed Dec. 9, 1987.

In electrical harness applications, such as for automobiles, there is a need to environmentally seal splices comprised of several wires. This is accomplished by wrapping a sealant about the wires and their junction. Forcing a sealant between the wires to afford a moisture tight seal can be very difficult, particularly if some stacking of the wires exists in the wire bundle. The present invention affords a method by which the wires are spread during the application of the sealant pad.

The present invention will provide the seal in substantially the same manner as the seal of the prior die plates but there is substantial improvement in the separation of the wires, the distribution of the sealant about the wires and any air in the pad, trapped when the pad is initially folded about the wire junction, is forced from the junction as the die plates are forced against the opposite sides of the sealant pad.

The present invention provides a pair of die plates for use in forming a water impermeable seal about a wire junction formed between two or more wires by engaging the pad on opposite sides along the middle portions of the pad to apply a squeezing force in the middle of the pad which force progresses toward the edges as the face of the die plates is deformed to tightly compress the entire pad between the plates.

The product of this invention provides a die plate which conforms to a wider range of wire diameters, it serves to spread the wires and force the sealant between wires in a bundle of wires of a wide range of wire sizes, whether they are the same or different diameters, entering or exiting the junction, and it reduces the possibility of wire insulation damage during pressing of the sealant. The present invention also restricts damage to the junction.

SUMMARY OF THE INVENTION

This invention provides a pair of elastomeric deformable die plates which are formed to secure a sealant pad about the junction of two or more wires. The die plates comprise a rigid support frame having a first face and a second face, said first face being generally rectangular with a recess and mechanical means for retaining a molded article on the face. The second face is adapted for mounting on a press member. A generally rectangular pad of compressible resilient material is supported on the first face of the frame. The resilient pad on at least one die plate has a convex semicylindrical cylindrical surface disposed on the side opposite said first face of the frame with the axis thereof positioned parallel to two sides of said frame. A recess, extending transversely of the convex surface has spaced walls extending from the convex surface to a flat surface connecting said walls, is provided for receiving a portion of a sealant pad positioned about the junction of the wires. This recess will restrict physical damage to the wire junctions as the die plates are forced together.

BRIEF DESCRIPTION OF THE DRAWING

The present invention will be described in greater detail with reference to the accompanying drawing wherein;

FIG. 3 is a perspective view of a pair of deformable die plates with a sealant pad wrapped about the junction between several wires;

FIG. 4 is a detail perspective of one of the die plates constructed according to the present invention;

FIG. 5 is a longitudinal sectional view of the die plate of FIG. 4 taken along the line 5—5 of FIG. 4;

FIG. 6 is a transverse sectional view taken along the line 6–6 of FIG. 4; and

DESCRIPTION OF THE PREFERRED EMBODIMENT

Figure 1:
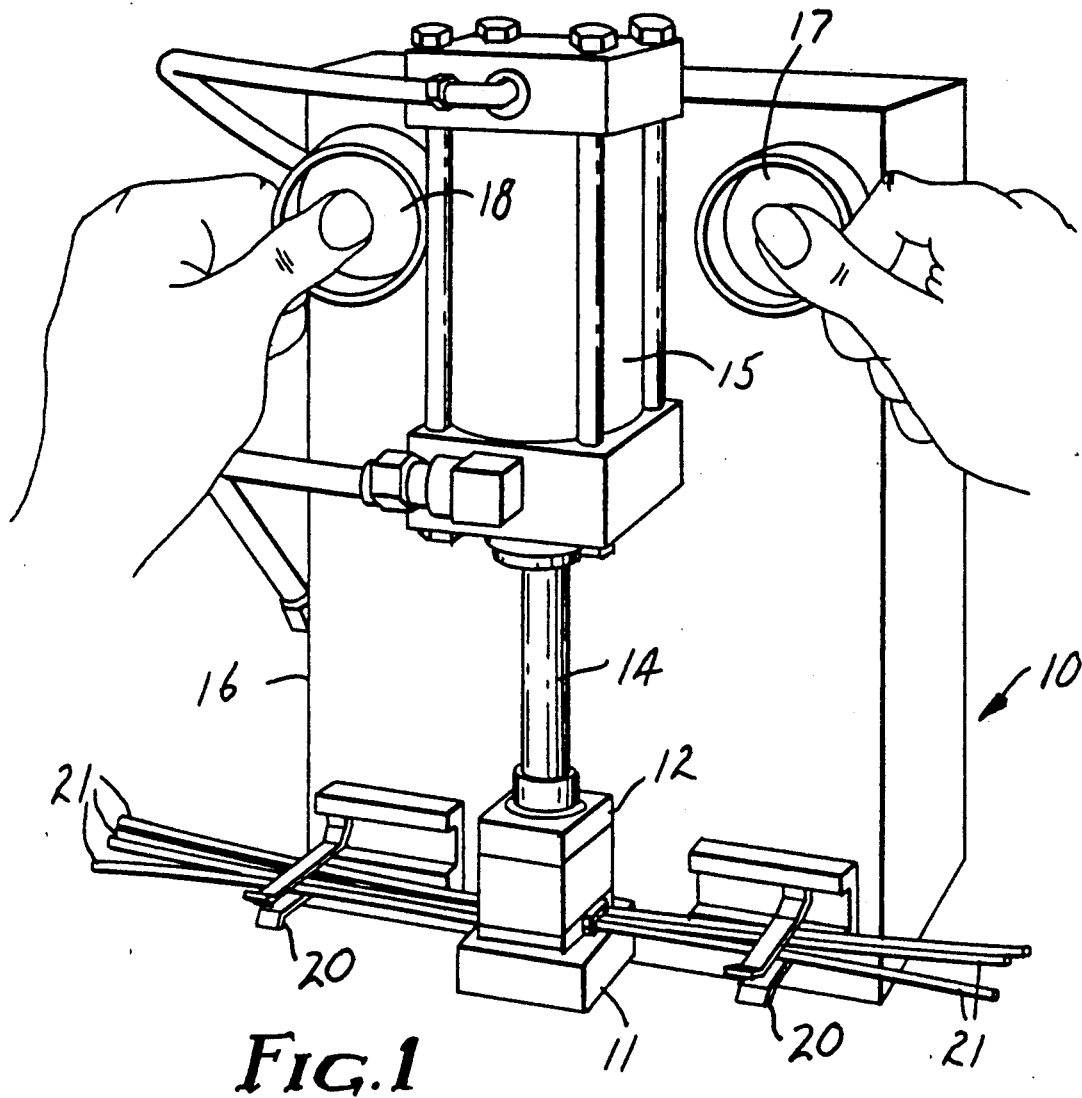
FIG. 1 is a diagrammatic perspective view of a press for placing a sealant pad about the junction between two or more wires.
Figure 2:
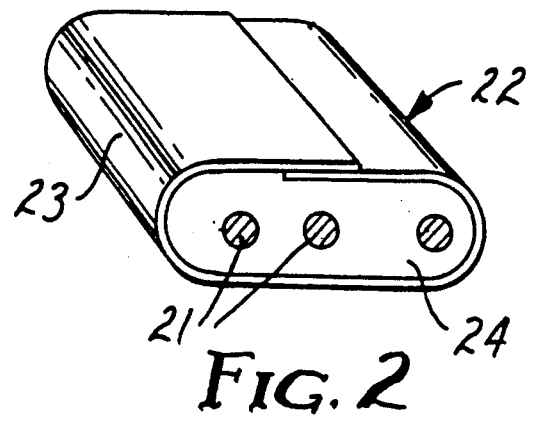
FIG. 2 is an enlarged detail sectional view of a sealant pad about the junction of several wires.

The present invention will be described with reference to the drawing wherein FIG. 1 represents a semiautomatic press for separating wires in a bundle and squeezing a sealant pad about a junction and about the wires leading to and from the junction. The press, generally designated 10, comprises a support platen 11 and a pressure head 12 fastened on the end of a piston rod 14 extending from a double acting fluid motor 15. The motor 15 is preferably an air driven reciprocating piston-cylinder construction with controls in a housing 16 to drive the head 12 toward and away from the platen 11 when operated from a set of dual switches 17 and 19 for safety reasons. Guide members 20 support the wires or cables 21, entering or exiting an electrical junction, to be sealed by the press and sealant pad 22, see FIG. 2.

The sealant pad 22 is used for insulating and sealing both simple and relatively complex wiring harness junctions involving a bundle of wires. The sealant also affords an electrical moisture seal. The sealant pad arrangement comprises substrate 23 having viscous sealant 24 thereon. The substrate 23 facilitates handling the viscous sealant 24 and protects against development of a sticky outer surface on the overall seal. A preferred substrate is an all-weather, flexible non-tacky vinyl plastic sheet or the like, typical all weather grade vinyl or polyvinyl chloride (PVC), having a thickness of about 0.004–0.008 inch (about 0.01–0.02 cm) may be utilized in arrangements of the present invention, although other materials and other thickness may be utilized.

A wide variety of sealant materials may be utilized on the substrate to engulf the electrical connection, in arrangements and methods according to the present invention. Generally what is required of such sealants is that they be sufficiently viscous to retain a preformed shape and to be moldable, a viscosity of about 2000 poise at a shear rate of 1/600 sec. at 75° C. being more than sufficient for most applications; exhibit sufficient adhesion, to the substrate and wire insulations to provide a good seal (typically 12.5 lbs./in width or 22N/10 mm is more than sufficient); exhibit a sufficiently high insulation resistance, for example about $1 \times 10^6$ megohms is obtainable and more than sufficient; exhibit sufficiently low water absorption, for example on the order of 0.75% is obtainable and effective; and, exhibit good adherence to metals from which wire connections may be made, for example an adherence of about the same as the above-related adherence to substrate and insulator. Adhesives or sealants usable include thick, rubber-based, compounds. Preferred sealants generally comprise soft, tackified, elastomeric compounds extended with oils and fillers. Typical, useable, elastomeric bases for such compositions include polyisobutylene/EPDM rubber mixtures. Such sealants do not readily degrade when exposed to automotive and marine environments. Further, they are not substantially adversely affected by severe vibration or extreme temperature change.

An embodiment of the sealant pad 22 which is preferred is an arrangement having a square piece of substrate 23 with a pad 24 of thick, viscous, moisture-resistant, sealant material, which can be readily molded around a junction, positioned on the substrate. The pad of sealant is asymmetrically placed on the substrate so as to provide a flap of substrate extending beyond and framing the pad along three of the four sides of the pad. More specifically, the sealant pad is rectangularly shaped and has three overlap portions to reduce the amount of the sticky sealant that will flow beyond the edges of the substrate as the pad is placed about a junction. This is particularly true if the pad is used on a wire harness wherein there are 4 large wires entering and perhaps 6 or 7 smaller wires leaving the junction.

Typically the pad substrate 23 is 2 inches by 2 inches (5 cm by 5 cm) and the pad 24 of sealant is 1.5 inches by 1.5 inches (3.8 cm by 3.8 cm). This provides a border about three sides of the pad. The pad is folded about the junction and is then placed in the press between the die plates. A pressure of between about 200 and 300 pounds per square inch (14 and 21 kgs./cm) is applied against the sealant pad.

The die plates of the present invention are illustrated in FIGS. 3–7. The die plates illustrated in FIG. 3 are identical and mirror images of each other when placed in the press. The die plates, generally designated 30, for presently preferred embodiments comprise a frame structure 31, of generally rectangular configuration of about 3 inches by 1.5 inches (7.6 cm by 3.8 cm), which has a first surface 32 for supporting a resilient pad 33. The first surface 32 has a retaining groove 34 extending between two opposite side walls which groove, as illustrated, is dove-tail shaped in cross-section or end view, Further, the frame has four (4) apertures 35 extending between the first surface 32 and the second opposite surface 36, which apertures aid in securing the edges of the pad 33 to the frame, and a larger central opening 37 communicating with the groove 34 and surface 36. The frame as illustrated has flanges 38, extending outwardly and coplanar from the opposite surface 36 and from along two opposite sides which flanges 38 serve to mount the frame 31 to the anvil 11 and to the head 12 of the press.

The head and anvil have L-shaped bars 39 mounted in spaced parallel relationship to receive therebetween the frame 31 with the flanges 38 fitting between the foot of the L-shaped bars and the head or anvil, see FIG. 3. The bars 39 thus form T-shaped grooves and detents are formed to retain the die plates against lengthwise displacement.

The pad 33 is formed of an elastomeric material with a durometer of between 30 and 90 on the Shore D scale, and is preferably between 50 and 60 on the Shore D scale. The pad 33 has a width greater than the width of the wire bundle when the wires are spread and a length that is one inch to 2.5 inches (2.54 to 6.35 cm) on each side of the junction where the seal is to be applied. The pad 33 has a thickness sufficient to conform to different wire diameters in simple and complex junctions without damaging the wire insulations, and is about one-eighth inch (0.3 cm) thick at the edges of the frame and one-fourth to three-eighths inch (0.6 to 0.95 cm) thick in the center, where the pad has a convex curvature formed above the groove 34. The convex surface is radiused to form a generally semicylindrical surface in the pad opposite the surface 32 formed with the groove 34. The radius is between 1.25 inch and 3 inches (3.17 and 7.6 cm) and the present preferred radius of the convex surface is about 2 inches (5 cm) and the pad has dimensions of 3 inches (7.6 cm) by 1.25 inches (3.1 cm). The pad is provided with a groove or recess extending transversely of the pad and generally normal to the axis of the convex surface. The recess is provided to accommodate the body of the wire splice or junction. The recess illustrated is defined by two inclined walls 41 and a bottom wall 42. This recess in each of the die plates 30 affords an area for the junction of the wire connection to be placed to allow the sealant pad to be compressed along its length but avoid rupture of the sealant substrate. The pressure is thus applied along the length of the pad before the total pressure is exerted against the junction of the wires.

The convex surface of the pad 33 allows the sealant pad to be compressed and the sealant to be forced between and around the wires. The convex surface affords a spreading or separation of the wires in the sealant pad as the compressive forces are initially greater in the center of the pad and progress from the center of the pad toward the edges. When the dies first close, they make line contact down the length of the splice. As the dies continue to close there is a spreading action away from the line of original contact that forces the individual wires of the splice outward. This progressive force upon the pad drives the sealant into the wires and outward from the middle of the pad to separate the wires. This wire separation exposes the wire surfaces and the sealant to surround the individual wires and restrict the migration of moisture along the wire to the junction.

The pads 33 are made of a silicone elastomer or silicone rubber material to provide the desired deformable characteristic. Further, the silicone material has a release characteristic affording means to avoid the sealant from sticking to the pads, which would be necessary as a coating on some other elastomeric materials if chosen. The silicone is believed to afford greater service life than a steel die with a release agent coated on the die.

The flanges 38 on the frame 31 of the die plates fit with the T-shaped grooves in the press head 12 and/or the anvil 11 to permit the die plates to be driven against each other and also separated. This mechanical separation is necessary to afford a clean adhesive free surface for receiving the successive wire junctions and pads as the harnesses are fabricated.

Figure 7:
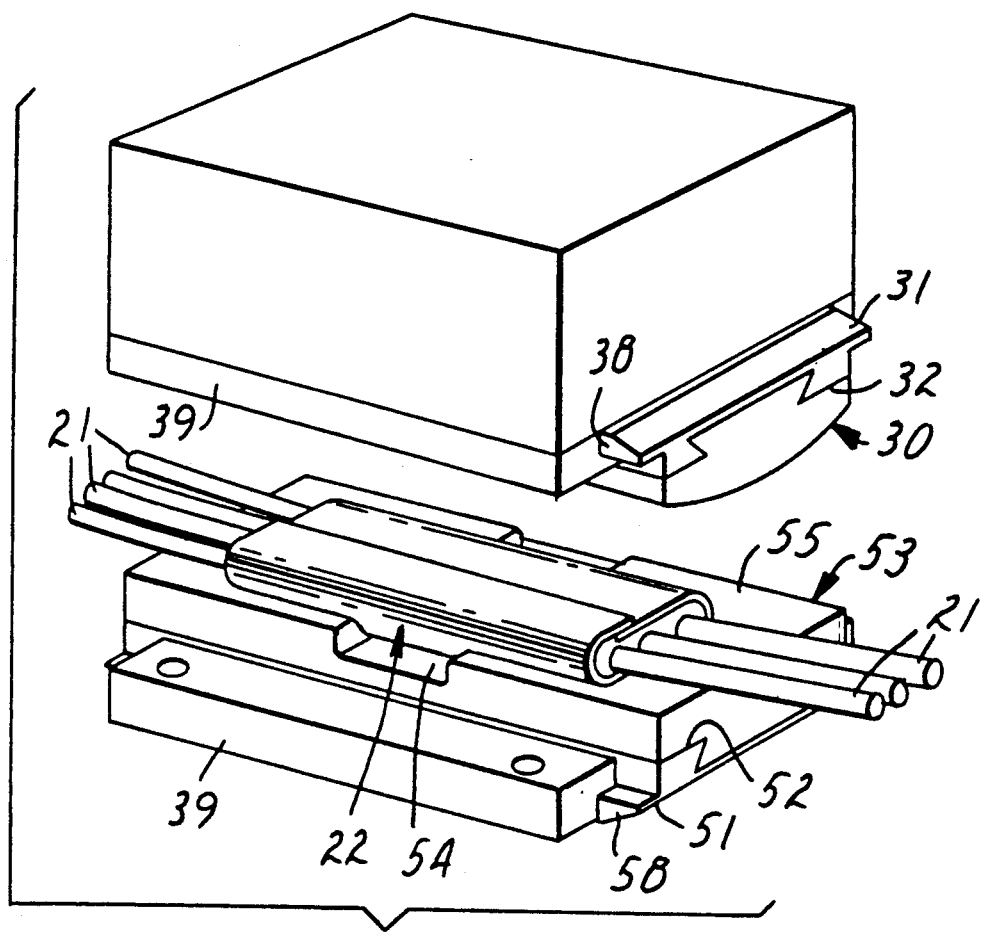
FIG. 7 is a perspective view of a pair of deformable die plates with a sealant pad wrapped about the junction between several wires, the bottom die plate of the pair of plates is generally flat.

The die plates illustrated in FIG. 7 include a die plate 30 as described above supported on the head of the press. The die plate supported on the anvil comprises a frame structure 51, corresponding to the frame structure 31, which has a first surface 52 for supporting a resilient pad 53. The frame has flanges 58, extending outwardly and coplanar from an opposite surface 56 of the frame and from along two opposite sides which flanges 58 serve to mount the frame 51 to the anvil 11. The pad 53 is formed of an elastomeric material as described above for pad 33 but the pad 53 is formed with a generally planar surface 55, except for a transverse recess or groove 54. This pad 55 and the pad 33 of the die plate 30 cooperate similar to the use of the two convex pads but they will lessen the spreading forces exerted on the wires 21 in a sealant pad 22.

When making a seal with the device and die plates as illustrated, the cycle time is about 2 to 5 seconds. When the pads close to touch along the edges of the die plates the pressure is relieved.

Having disclosed the invention with reference to the illustrated embodiment, it is to be understood that modifications may be made to the present invention without departing from this invention as defined by the appended claims.

We claim:

1. A pair of die plates for use in applying a sealant pad arrangement comprising a flexible substrate having a pad of viscous sealant thereon about an electrical junction joining at least a pair of wires, each said die plate comprising:
   a rigid generally rectangular support frame having a first face and a second face, two longitudinal sides and opposite ends, and
   a generally rectangular deformable pad of resilient material supported on said first face of said frame, said deformable pads having a convex semicylindrical surface disposed on the side of the pad opposite said first face of the frame with the axis of said convex surface being positioned parallel to said two sides of said frame, and said frame affording said pads to be deformed as said pair of die plates move toward each other to a closed position, and said deformable pads having opposed recesses extending transversely across said deformable pads and generally centrally thereof between opposite ends of said frames to receive the central portion of a said sealant pad and a wire junction, whereby the closing of the deformable pads upon a sealant pad will cause pressure to occur initially along an axis between said ends of the deformable pads, and as the frames move even closer, to cause the deformable pads to spread the wires and to fill the space between the wires with the viscous sealant on the sealant pad.

2. A pair of die plates according to claim 1 wherein said second surface of said frame of each said die plate comprises means for retaining a said frame on a press.

3. A pair of die plates according to claim 1 wherein said convex surface of said pads has a radius of about 1.25 to 3 inches.

4. A pair of die plates according to claim 3 wherein said convex surface of said deformable pads has a radius of about 2 inches.

5. A pair of die plates according to claim 1 wherein said deformable pads are formed of a elastomeric composition having a durometer on the Shore D scale of between 30 and 90.

6. A pair of die plates according to claim 1 wherein said deformable pads are formed on a silicone composition having a durometer on the Shore D scale of between 50 and 60.

* * * * *